United States Patent
Kato (10) Patent No.: US 8,035,366 B2
(45) Date of Patent: Oct. 11, 2011

(54) DRIVING CIRCUIT OF LOAD

(75) Inventor: Yuji Kato, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 218 days.

(21) Appl. No.: 12/567,061

(22) Filed: Sep. 25, 2009

(65) Prior Publication Data

US 2010/0085025 A1    Apr. 8, 2010

(30) Foreign Application Priority Data

Oct. 3, 2008  (JP) ................. P2008-258517

(51) Int. Cl.
*G05F 1/00* (2006.01)
(52) U.S. Cl. .................. 323/282; 323/283; 323/284
(58) Field of Classification Search .............. 323/222, 323/271, 282, 283, 284, 312, 315, 316
See application file for complete search history.

(56) References Cited

U.S. PATENT DOCUMENTS

| | | | |
|---|---|---|---|
| 6,476,589 B2* | 11/2002 | Umminger et al. ........... | 323/282 |
| 7,268,529 B2* | 9/2007 | Mochizuki et al. ........... | 323/316 |
| 7,408,388 B2* | 8/2008 | Nagasawa et al. ............ | 327/110 |
| 7,764,057 B2* | 7/2010 | Groom .......................... | 323/283 |
| 2003/0020442 A1* | 1/2003 | Hwang ......................... | 323/288 |

FOREIGN PATENT DOCUMENTS

JP    2000-114039    4/2000

* cited by examiner

*Primary Examiner* — Adolf Berhane
*Assistant Examiner* — Nguyen Tran
(74) *Attorney, Agent, or Firm* — Oblon, Spivak, McClelland, Maier & Neustadt, L.L.P.

(57) ABSTRACT

A driving circuit of a load has an output semiconductor element connected in series in a power supply path from a power source to the load, to control a current of the load, a PWM signal generator for controlling ON/OFF of the output semiconductor element, a driver of the output semiconductor element according to the PWM signal, a detection resistor made of a semiconductor detecting a current of the load, a current output amplifier outputting a monitored current of detection resistor without being influenced by variation of ambient temperature, a resistor converting the monitored current into a monitored voltage, a current source outputting a constant current without being influenced by variation of ambient temperature, a resistor outputting a reference voltage according to the constant current, and an A/D converter converting the monitored voltage according to the reference voltage into a detected current value of the current of the load.

4 Claims, 6 Drawing Sheets

DRIVING CIRCUIT OF LOAD

BACKGROUND OF THE INVENTION

1. Field of the Invention

The present invention relates to a driving circuit to supply a controlled current to a load.

2. Description of the Related Art

Driving circuits employing semiconductor elements such as FETs (Field Effect Transistors) to supply current to load and drive the load are used in various fields. An example of a device employing such a driving circuit is a linear solenoid. The linear solenoid applies voltage to an excitation coil so as to generate magnetic force that directly linearly drives a movable iron core. The linear solenoid is capable of linearly controlling hydraulic pressure according to a control current from the driving circuit, and therefore, is used in the field of car electronics to control, for example, a braking hydraulic pressure and an automatic transmission.

Figure 1:
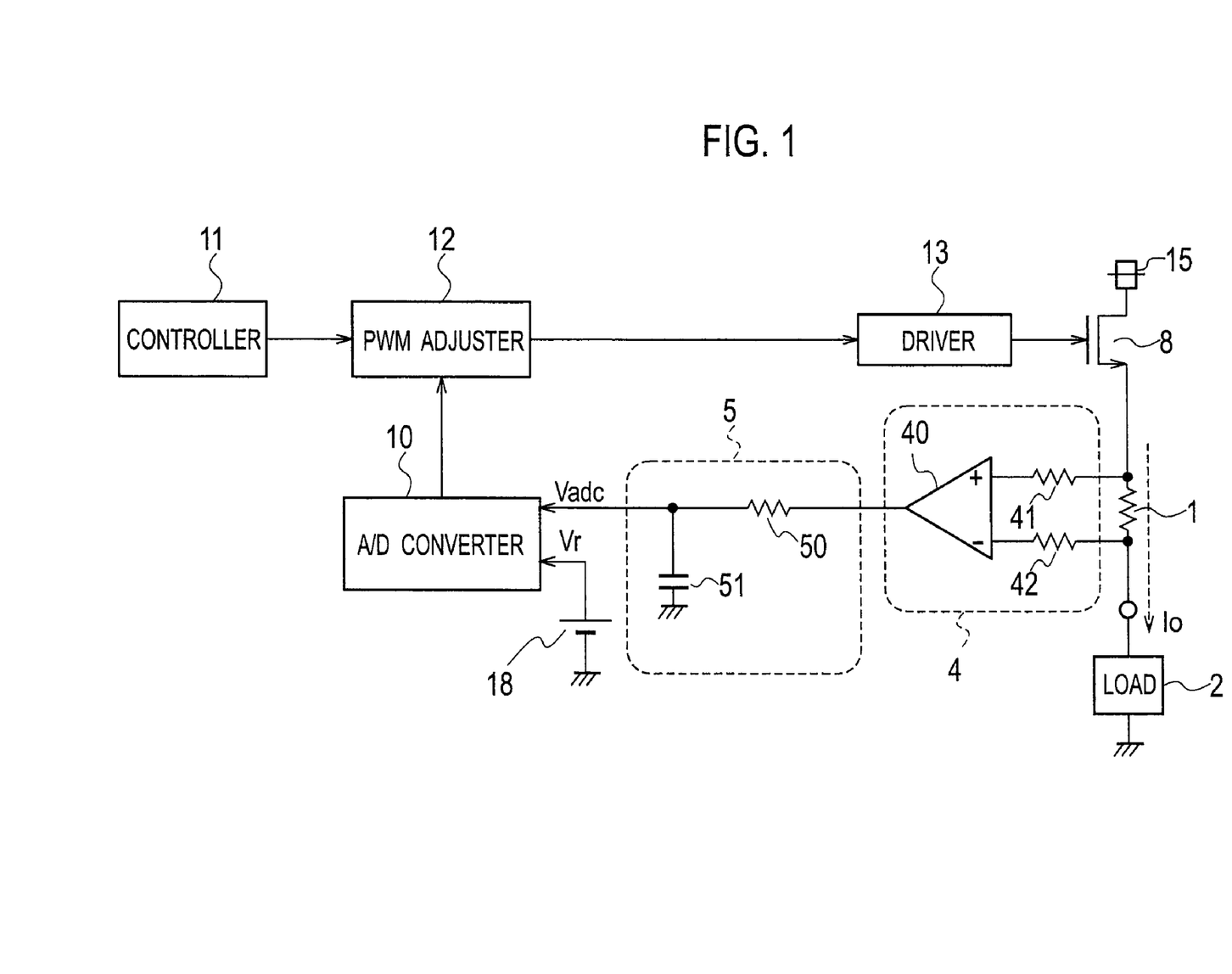
FIG. 1 is a block diagram illustrating a driving circuit of a load according to a related art.

FIG. 1 is a block diagram illustrating a driving circuit of a load according to a related art. The driving circuit includes a detection resistor 1, the load 2, a differential amplifier 4, an integrator 5, an output semiconductor element 8, an A/D converter 10, a controller 11, a PWM (Pulse Width Modulation) adjuster 12, a driver 13, and a power source 15. The driving circuit functions to supply a current instructed by the controller 11 to the load 2.

The detection resistor 1 is arranged upstream from the load 2, to receive a current Io passing from the power source 15 through the output semiconductor element 8 to the load 2 and convert the current Io into a voltage. The detection resistor 1 may be made of a semiconductor so that the detection resistor 1 is arranged on a single chip together with the output semiconductor element 8 and other devices, to reduce the cost and size of the driving circuit.

The differential amplifier 4 includes an operational amplifier 40 and resistors 41 and 42. When a current passes through the detection resistor 1 to the load 2, the differential amplifier 4 amplifies a voltage across the detection resistor 1. The amplified voltage from the differential amplifier 4 is indicative of the magnitude of the current passing through the load 2 and is used to control a current of the load 2.

The integrator 5 includes a resistor 50 and a capacitor 51, to smooth the voltage from the differential amplifier 4. Namely, the integrator 5 provides a voltage corresponding to an average of current passing through the load 2.

The output semiconductor element 8 is generally an FET and is connected in series in a power supply path from the power source 15 to the load 2. According to a drive voltage applied by the driver 13 to a gate of the output semiconductor element 8, the output semiconductor element 8 turns on/off (PWM control) to control the current Io to the load 2. The output semiconductor element 8 may be a bipolar transistor.

The A/D converter 10 compares an output voltage Vadc from the integrator 5 with a reference voltage Vr from a reference voltage source 18. The reference voltage Vr is stable with respect to temperature. The A/D converter 10 outputs, based on the comparison, a digital detected current value corresponding to the current Io to the load 2. Generally, the reference voltage Vr is set to be higher than the output voltage Vadc from the integrator 5.

The controller 11 is, for example, a CPU to calculate a current value necessary for making the load 2 perform an objective operation and output an instructed current value.

The PWM adjuster 12 compares the instructed current value with the detected current value from the A/D converter 10 and outputs a PWM signal to equalize a current to be passing through the load 2 with the instructed current value.

According to the PWM signal, the driver 13 conducts ON/OFF control of the output semiconductor element 8 to pass the instructed current through the load 2.

In this way, the driving circuit illustrated in FIG. 1 having the above-mentioned configuration conducts feedback control so that a current to the load 2 agrees with an instructed current value from the controller 11.

Another related art disclosed in Japanese Unexamined Patent Application Publication No. 2000-114039 is a linear solenoid failure detecting apparatus that quickly detects a short to ground in a wiring system or coil of a linear solenoid and prevents the deterioration or breakage of transistors and resistance elements in a driving stage. This apparatus includes the linear solenoid to obtain a displacement amount according to the magnitude of a driving current, a driver to control the driving current, a current detector to output a value corresponding to the driving current, an integrator having a resistance element and capacitor to integrate output values from the current detector, and an electric element that is connected in parallel with the resistance element of the integrator, to follow a rise of an output from the current detector and add a value corresponding to the output value from the current detector to an output value from the integrator.

If a short to ground occurs in the linear solenoid, the output value from the current detector shows a steep rise, which is instantaneously reflected in the output value from the integrator through the electric element (diode) connected in parallel with the resistance element. As results, a short-to-ground-failure detecting time in which the output voltage from the integrator exceeds a failure testing voltage becomes very short, to prevent the deterioration or breakage of the transistors and resistance elements in the driving stage of the linear solenoid.

SUMMARY OF THE INVENTION

In the driving circuit of a load according to the related art of FIG. 1, the voltage Vadc to the A/D converter 10 when the current Io is passed to the load 2 is expressed as, $$V_{adc} = G \cdot R_S \cdot I_O \qquad (1),$$

where Rs is a resistance value of the detection resistor 1 and G is a gain of the differential amplifier 4. The gain G of the differential amplifier 4 is quite stable with respect to ambient temperature because the differential amplifier 4 uses the operational amplifier 40. The resistance value Rs of the detection resistor 1, however, varies due to manufacturing variation such as the concentration variation of implanted impurities of the semiconductor that forms the detection resistor 1. To correct the variation of the resistance value Rs, the driving circuit may have a function of adjusting the gain G of the differential amplifier 4.

The resistance value Rs of the detection resistor 1 made of semiconductor has another problem of having a temperature coefficient in the range of several hundreds to several thousands of ppm/° C. This results in providing the voltage Vadc to the A/D converter 10 with a temperature characteristic. Namely, the current Io passing through the load 2 changes depending on temperature during the feedback control of the current Io. There is an idea to grasp the temperature characteristic of the detection resistor 1 in advance and provide the differential amplifier 4 with a temperature characteristic that corrects the temperature characteristic of the detection resistor 1. The temperature characteristic of the detection resistor 1, however, is hardly grasped because it varies depending on manufacturing variation.

To solve the problems of the related arts, the prevent invention provides a driving circuit of a load, capable of correctly passing an instructed current to the load irrespective of temperature variation.

According to an aspect of the present invention, the driving circuit of a load has a first semiconductor element that is connected in series in a power supply path from a DC power source to the load and is turned on/off to control a current passing through the load. The driving circuit includes a PWM signal generator configured to generate a PWM signal for controlling ON/OFF of the first semiconductor element; a driver configured to drive the first semiconductor element according to the PWM signal; a first resistor made of a semiconductor, connected in series with the first semiconductor element and load, and configured to detect a current passing to the load; a current detector configured to output a monitored current corresponding to the current passing through the first resistor without being influenced by variation of ambient temperature; a second resistor configured to convert the monitored current into a monitored voltage; an integrator configured to smooth the monitored voltage; a current source configured to output a constant current without being influenced by variation of ambient temperature; a third resistor configured to output a reference voltage according to the constant current; and an A/D converter configured to convert the smoothed monitored voltage according to the reference voltage into a detected current value of the current passing to the load. The PWM signal generator adjusts the PWM signal according to a target current value and the detected current value in such a way as to supply a target current to the load.

DESCRIPTION OF THE PREFERRED EMBODIMENT

First Embodiment

Figure 2:
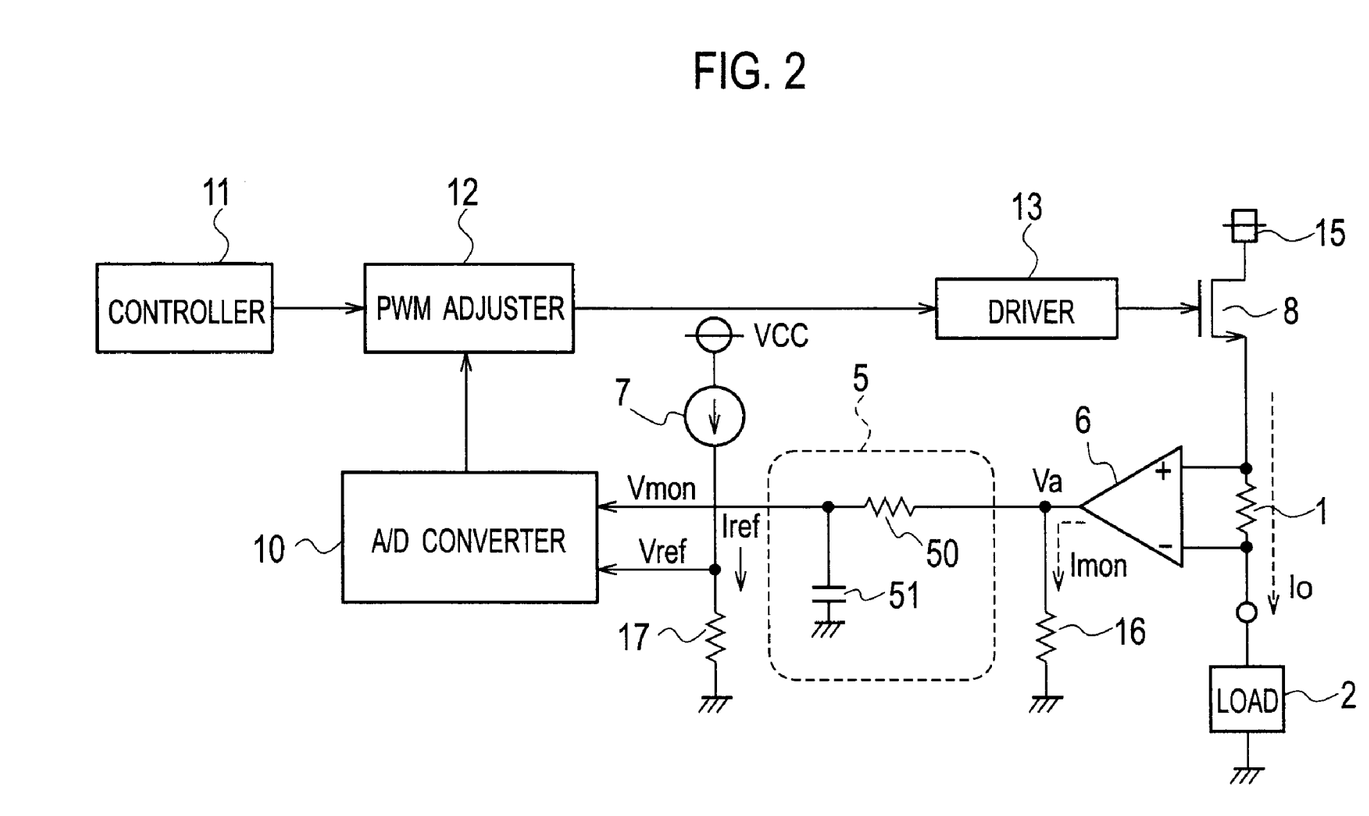
FIG. 2 is a block diagram illustrating a driving circuit of a load according to a first embodiment of the present invention.
Figure 3:
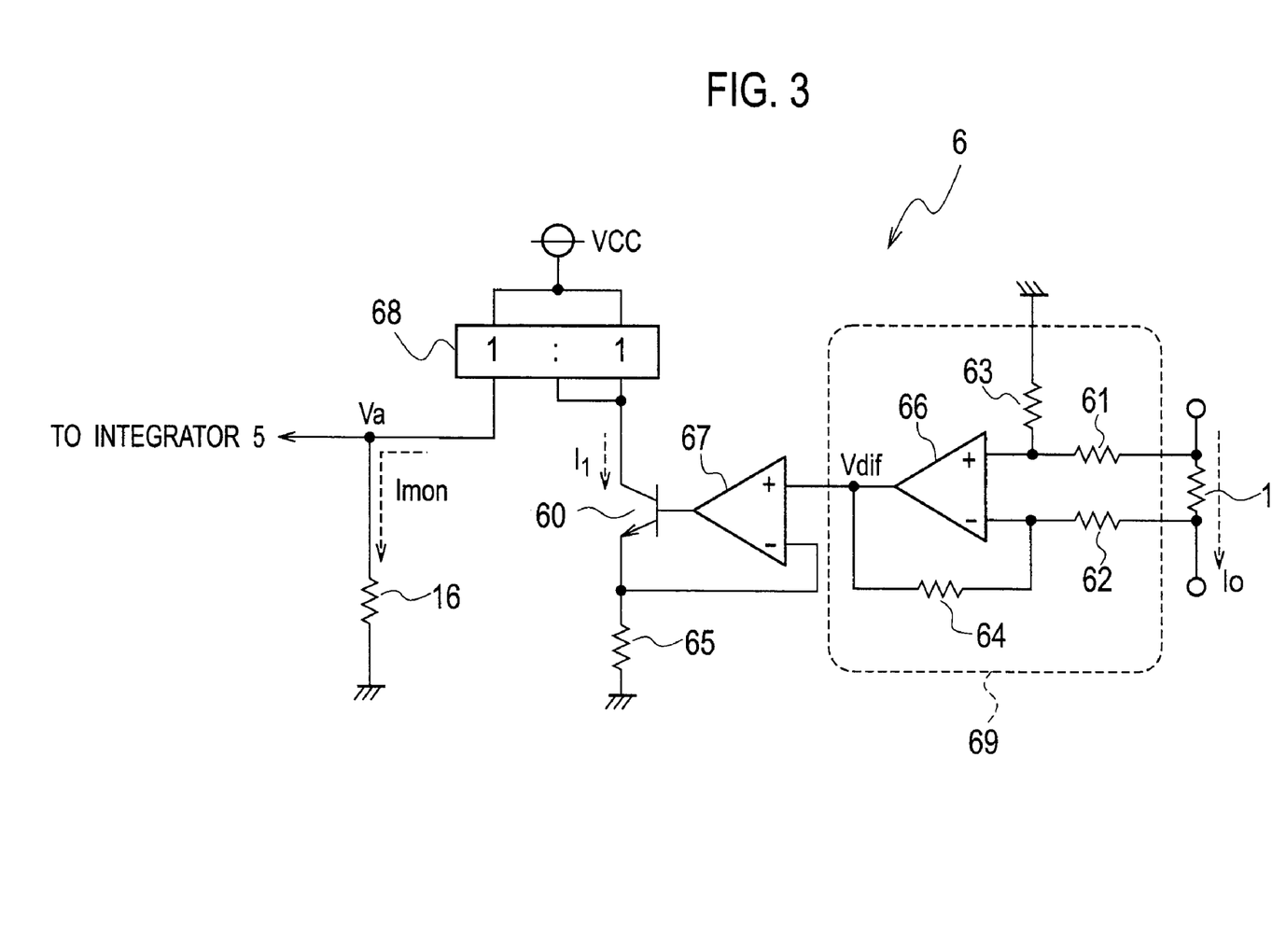
FIG. 3 is a circuit diagram illustrating an example of a current output amplifier arranged in the driving circuit of the first embodiment.
Figure 4:
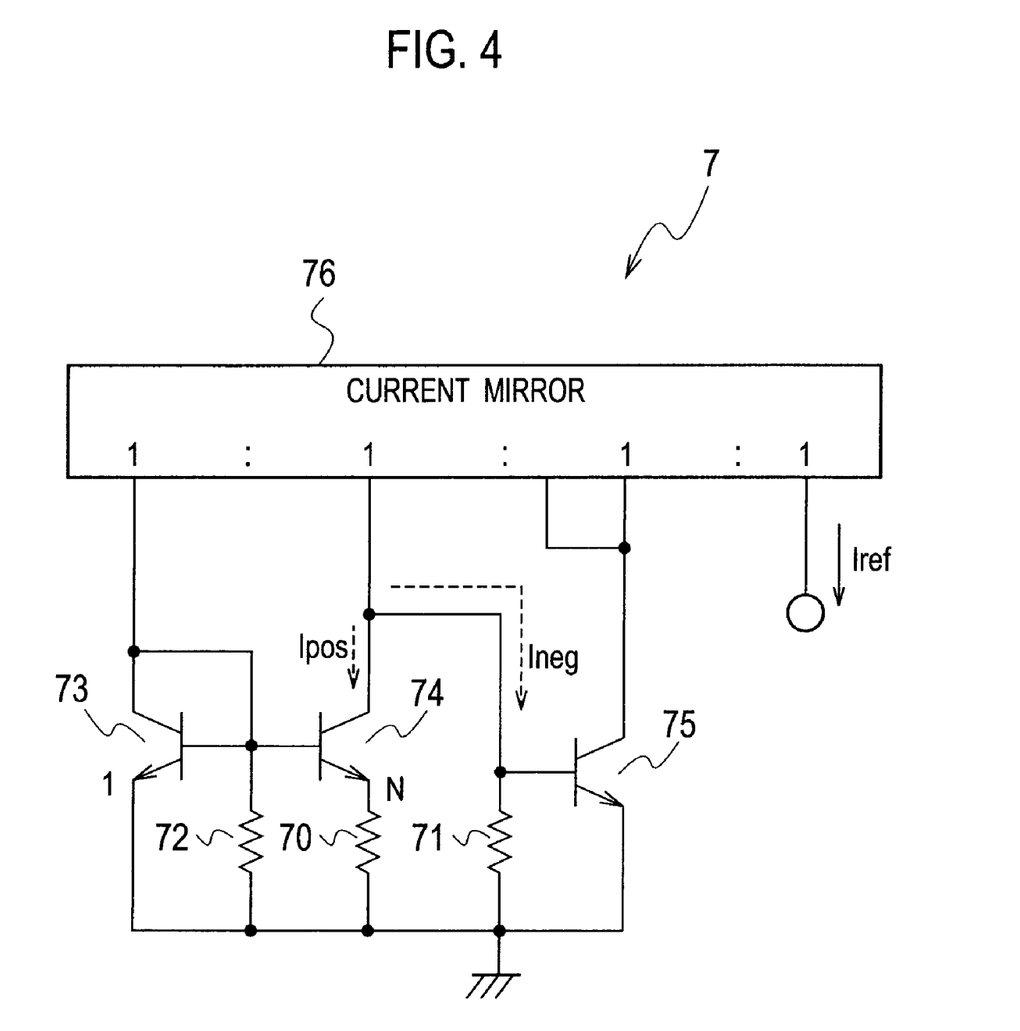
FIG. 4 is a circuit diagram illustrating an example of a current source arranged in the driving circuit of the first embodiment.

FIG. 2 is a block diagram illustrating a driving circuit of a load according to the first embodiment of the present invention. FIG. 3 is a circuit diagram illustrating an example of a current output amplifier 6 arranged in the driving circuit of the first embodiment. FIG. 4 is a circuit diagram illustrating an example of a current source 7 arranged in the driving circuit of the first embodiment.

In FIG. 2, the driving circuit according to the first embodiment of the present invention includes a detection resistor 1, an integrator 5, the current output amplifier 6, the current source 7, an output semiconductor element 8, an A/D converter 10, a controller 11, a PWM adjuster 12, a driver 13, a power source 15, and resistors 16 and 17, to drive the load 2.

The controller 11 is, for example, a CPU that calculates a current value passing through the load 2 so that the load 2 may perform a requested operation and outputs the calculated current value as an instructed current value. The controller 11 may be present outside the driving circuit, to provide the driving circuit with an external signal.

The PWM adjuster 12 corresponds to the "PWM signal generator" stipulated in the claims and generates a PWM signal to conduct ON/OFF control of the output semiconductor element 8. According to the instructed current value from the controller 11, i.e., a target current value and a detected current value from the A/D converter 10, the PWM adjuster 12 adjusts the PWM signal so that a target current passes through the load 2.

The driver 13 drives the output semiconductor element 8 according to the PWM signal from the PWM adjuster 12.

The output semiconductor element 8 corresponds to the "first semiconductor element" stipulated in the claims, is connected in series with a power supply path from the DC power source 15 to the load 2, and is turned on/off to control a current passing through the load 2.

The detection resistor 1 corresponds to the "first resistance element" stipulated in the claims, is connected in series with the output semiconductor element 8 and load 2, and is made of a semiconductor to detect a current passing to the load 2. The detection resistor 1 as a resistance element has a resistance value of Rs. The detection resistor 1 made of a semiconductor can be formed on a single chip together with the output semiconductor element 8 and other devices, to reduce the cost and size of the driving circuit.

The current output amplifier 6 corresponds to the "current detector" stipulated in the claims and outputs a monitored current Imon corresponding to a current passing through the detection resistor 1 without being affected by variation of ambient temperature. As illustrated in FIG. 3, the current output amplifier 6 according to the first embodiment includes a transistor 60, a resistor 65, an operational amplifier 67, a current mirror 68, and a differential amplifier 69. The differential amplifier 69 includes resistors 61, 62, 63, and 64 and an operational amplifier 66.

When the current Io passes through the detection resistor 1, a voltage across the detection resistor 1 is amplified by the resistors 61, 62, 63, and 64 and operational amplifier 66 and is outputted as a voltage Vdif. The resistors 61, 62, 63, and 64 have resistance values R61, R62, R63, and R64, respectively. These resistance values are selected to satisfy relationships of R61=R62 and R63=R64. Then, the output voltage Vdif from the differential amplifier 69 is expressed by, $$V_{dif} = \frac{R_{63}}{R_{61}} \cdot I_O \cdot R_S. \tag{2}$$

The output voltage Vdif from the differential amplifier 69 is supplied to a positive-phase input terminal of the operational amplifier 67. The operational amplifier 67 controls an emitter of the transistor 60 to Vdif, and therefore, a current I1 passing through the transistor 60 is expressed by, $$I_1 = \frac{V_{dif}}{R_{65}}. \quad (3)$$

As a result, the current mirror 68 outputs the detected current Imon having a current value equal to that of the current I1. The detected current value Imon is expressed as, $$I_{mon} = I_1 = \frac{V_{dif}}{V_{65}} = \frac{R_S}{R_{65}} \cdot \frac{R_{63}}{R_{61}} \cdot I_0. \quad (4)$$

As the expression (4) indicates, the current output amplifier 6 can output the current Imon that is a resistance ratio times the current Io passing to the load 2 without being influenced by processing variation or temperature variation, if the resistors 61, 62, 63, 64, and 65 and the detection resistor 1 are made of the same material in the same size. Namely, the current Imon is unchanged without regard to variation of ambient temperature.

The resistor 16 corresponds to the "second resistance element" stipulated in the claims and converts the monitored current Imon from the current output amplifier 6 into a monitored voltage Va.

The integrator 5 includes the resistor 50 and capacitor 51 to smooth the monitored voltage Va from the resistor 16 into a monitored voltage Vmon. The integrator 5 is not an imperative element and is replaceable with, for example, a sample hold circuit.

The current source 7 provides a constant current without being influenced by ambient temperature variation. As illustrated in FIG. 4, the current source 7 according to the first embodiment includes resistors 70, 71, 72, transistors 73, 74, and 75, and a current mirror 76, to provide a stable output current irrespective of temperature variation. The circuit configuration of the current source 7 illustrated in FIG. 4 is described in, for example, Gabriel Alfonso Rincon-Mora, "Voltage Reference", Wiley Interscience.

In FIG. 4, an emitter area ratio of the transistors 73 and 74 is 1:N. In this case, a potential difference between ends of the resistor 70 is VT1n (N). Here, VT is expressed by VT=k·T/q, where k is the Boltzmann constant, q is charge, and T is an absolute temperature. Accordingly, a current Ipos passing through the resistor 70 is expressed as, $$I_{pos} = \frac{k \cdot T}{q \cdot R_{70}} \ln(N). \quad (5)$$

The current Ipos is proportional to the absolute temperature T, and therefore, increases as an ambient temperature increases. The resistor 72 is arranged to supply the same current to the transistors 73 and 74. A current Ineg passing to the resistor 71 is expressed by, $$I_{neg} = \frac{V_{be75}}{V_{71}}, \quad (6)$$

where Vbe75 is a base-emitter voltage Vbe of the transistor 75, and in general, changes at −2 mV/° C. with respect to temperature. The current Iref from the current source 7 is the sum of the currents Ipos and Ineg due to the current mirror 76. Namely, the current Iref is expressed as, $$I_{ref} = I_{pos} + I_{neg} = \frac{k \cdot T}{q \cdot R_{70}} \ln(N) + \frac{V_{be75}}{R_{71}}. \quad (7)$$

As is apparent from the expression (7), the current source 7 can adjust a ratio between the current Ipos that positively changes with respect to temperature and the current Ineg that negatively changes with respect to temperature, if the resistance values R70 and R71 of the resistors 70 and 71 are properly selected. Namely, with the resistors 70 and 71 having appropriate resistance values, the current source 7 can serve as a current source having no temperature characteristic (i.e., not influenced by ambient temperature).

In the expression (7), N is an area ratio of the transistors 73 and 74 as mentioned above. By forming the resistors 70 and 71 from the same material in the same size, the current Iref is stabilized without regard to processing variation or temperature variation.

If the resistance values R70 and R71 of the resistors 70 and 71 vary due to processing variation, the absolute value of the current Iref changes. Accordingly, the driving circuit of the first embodiment may have a trimming function at the time of manufacturing to adjust the absolute value of the current Iref. Instead of adjusting the absolute value of the current Iref, a resistor having an appropriate resistance value may be selected as the resistor 17, to adjust the reference voltage Vref to a predetermined value.

The resistor 17 corresponds to the "third resistance element" stipulated in the claims and outputs the reference voltage Vref according to the current Iref from the current source 7. The resistors 16 and 17 are selected to have the same temperature coefficient, the temperature coefficient indicating a ratio of change of resistance value with respect to temperature change. For this, the resistors 16 and 17 are made from the same material in the same size. The resistors 16 and 17 have resistance values R16 and R17, respectively. A ratio R16/R17 of the resistance values R16 and R17 is not affected by temperature variation even if the resistance values vary due to temperature variation.

The A/D converter 10 uses the reference voltage Vref from the resistor 17, to convert the smoothed monitored voltage Vmon from the integrator 5 into a detected current value of the current passing through the load 2. As mentioned above, the ratio R16/R17 of the resistance values R16 and R17 is not affected by temperature variation, and accordingly, the A/D converter 10 is not influenced by temperature variation when comparing the monitored voltage Vmon with the reference voltage Vref and conducting the A/D conversion.

Operation of the first embodiment will be explained. The controller 11 calculates a current value to a current passing through the load 2 and outputs the calculated value as an instructed current value. The PWM adjuster 12 uses the instructed current value to generate a PWM signal to control ON/OFF of the output semiconductor element 8.

The driver 13 uses the PWM signal from the PWM adjuster 12 and drives the output semiconductor element 8. The output semiconductor element 8 carries out ON/OFF operation according to a voltage from the driver 13, to control a current passing through the power source 15 and the load 2.

The current passing through the load 2 also passes through the detection resistor 1 and is converted by the detection resistor 1 into a voltage to the current output amplifier 6. As mentioned above, the current output amplifier 6 involves the resistance values of R61=R62 and R63=R64, to output a monitored current Imon according to the expression (4). The monitored current Imon is equal to a value obtained by multiplying the current Io passing through the detection resistor 1 by a resistance ratio as defined by (Rs·R63)/(R65·R61). The resistors 61, 62, 63, 64, and 65 and the detection resistor 1 are made from the same material in the same size, so that the resistors have the same temperature coefficient. Accordingly, the resistance ratio of (Rs·R63)/(R65·R61) is unchanged without regard to temperature variation. Namely, the monitored current Imon is unaffected by variation of ambient temperature. In addition, the resistance ratio of (Rs·R63)/(R65·R61) is unchanged without regard to processing variation.

The resistor 16 converts the monitored current Imon from the current output amplifier 6 into a monitored voltage Va, which is supplied to the integrator 5. The integrator 5 smoothes the monitored voltage Va into a monitored voltage Vmon.

The current source 7 is configured as illustrated in FIG. 4. By properly selecting the resistors 70 and 71, the current source 7 can output the constant current Iref without being influenced by variation of ambient temperature. The current Iref is converted into the reference voltage Vref by the resistor 17 and is supplied to the A/D converter 10. As mentioned above, the resistors 16 and 17 are made of the same material in the same size, and therefore, have similar temperature coefficients, so that a resistance ratio of R16/R17 is not influenced by temperature variation. The resistance values R70 and R71 of the resistors 70 and 71 may involve processing variation, and therefore, each of current sources 7 that are mass-produced must be adjusted so that the absolute value of the current Iref is equal to a predetermined value at, for example, room temperature.

The A/D converter 10 uses the reference voltage Vref from the resistor 17, to convert the smoothed monitored voltage Vmon from the integrator 5 into a detected current value of the current passing to the load 2. The resistors 16 and 17 have temperature coefficients, respectively, and therefore, the reference voltage Vref and monitored voltage Vmon supplied to the A/D converter 10 change depending on temperature variation. For this, the resistors 16 and 17 are provided with similar temperature coefficients so that the resistance ratio of R16/R17 may not be influenced by temperature variation. The A/D converter 10, therefore, is not affected by temperature variation when comparing the monitored voltage Vmon and reference voltage Vref with each other for A/D conversion. The A/D converter 10 correctly carries out the A/D conversion to provide a current value of the current passing through the load 2.

The PWM adjuster 12 uses the instructed current value from the controller 11 as a target current value and the detected current value from the A/D converter 10 and adjusts a PWM signal in such a way as to supply the target current to the load 2.

The driving circuit according to the first embodiment repeats the above-mentioned operation to carry out feedback control so as to equalize the current passing to the load 2 with the instructed current value from the controller 11 without being influenced by variation of ambient temperature.

In this way, the driving circuit according to the first embodiment of the present invention properly controls a current passing through the load without being influenced by temperature variation, so that a current whose value is equal to an instructed current value from the controller 11 passes through the load 2.

To prepare the driving circuit on a single chip and reduce costs, the detection resistor 1 is made of a semiconductor. This may result in increasing the temperature coefficient of the detection resistor 1 and changing the resistance value thereof depending on temperature variation. However, the current output amplifier 6 of the above-mentioned configuration is able to output a monitored current Imon representative of a current passing to the detection resistor 1 without being influenced by a change in the resistance value of the detection resistor 1 caused by temperature variation. The configuration of the current output amplifier 6 illustrated in FIG. 3 is only an example. The current output amplifier 6 may have any configuration if the configuration is able to provide a detected current without being influenced by a change in the resistance value of the detection resistor 1.

The current source 7 of the above-mentioned configuration is capable of outputting the constant current Iref without being influenced by variation of ambient temperature. The configuration of the current source 7 illustrated in FIG. 4 is only an example. The current source 7 may employ any configuration if the configuration outputs a constant current without being influenced by variation of ambient temperature.

The A/D converter 10 correctly calculates the current value of a current passing through the load 2 according to the reference voltage Vref provided by the resistor 17 according to the reference current Iref and a monitored voltage Vmon that is prepared by converting the monitored current Imon into a monitored voltage Va through the resistor 16 and by smoothing the monitored voltage Va through the integrator 5.

The resistors 16 and 17 are made of the same material in the same size, and therefore, have similar temperature coefficients. Namely, the resistance ratio of R16/R17 is unaffected by temperature variation. Accordingly, the A/D converter 10 is capable of comparing the reference voltage Vref and monitored voltage Vmon with each other, and based on the comparison, correctly calculate a detected current value without being influenced by temperature variation.

Figure 5:
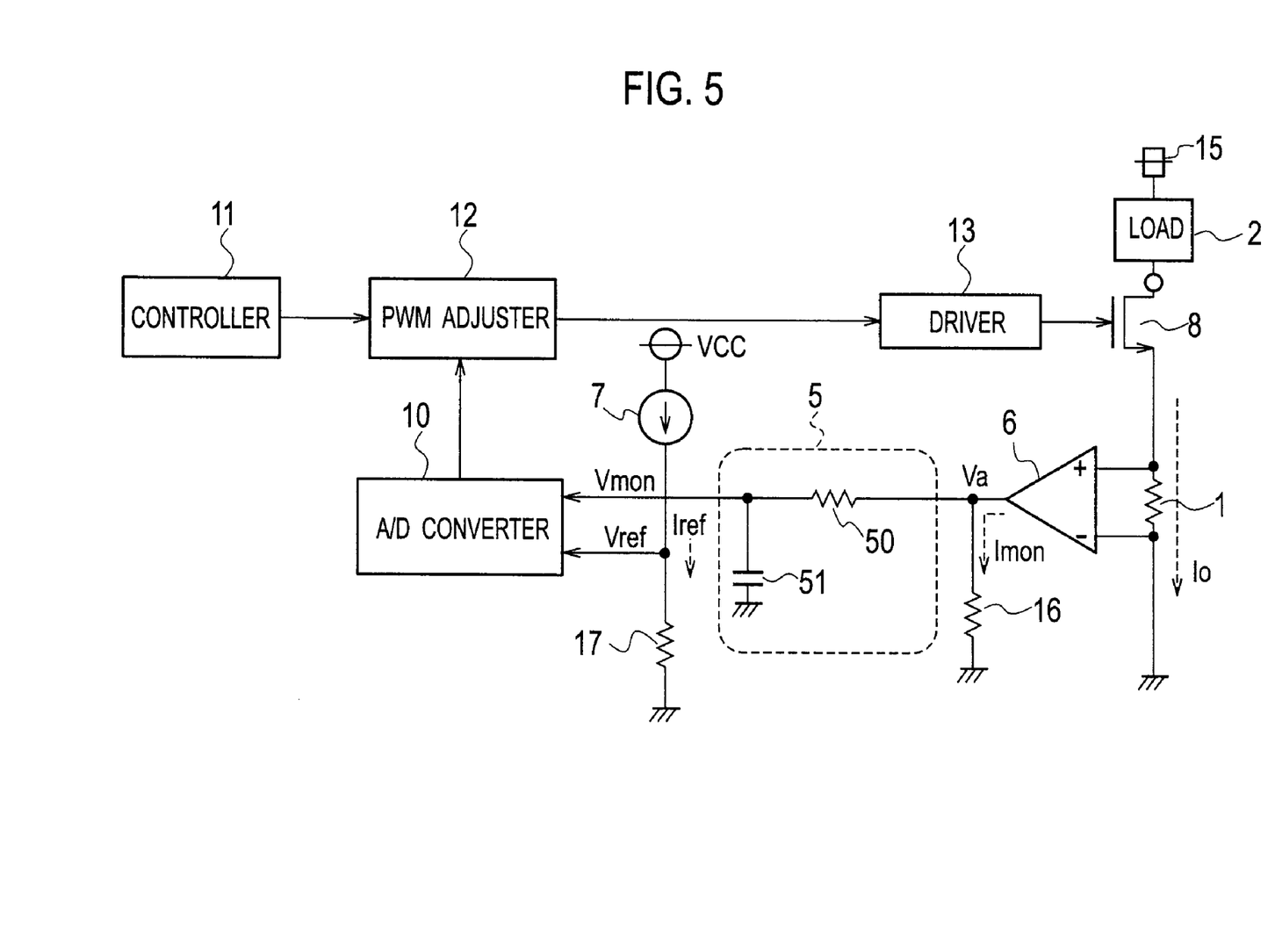
FIG. 5 is a block diagram illustrating a driving circuit of a load according to a modification of the first embodiment.

FIG. 5 is a block diagram illustrating a driving circuit of a load according to a modification of the first embodiment of the present invention. According to the first embodiment illustrated in FIG. 2, the detection resistor 1 is connected between the output semiconductor element 8 and the load 2. The connecting point of the detection resistor 1 is not limited to the one illustrated in FIG. 2. According to the modification illustrated in FIG. 5, the load 2 is connected between a drain of the output semiconductor element 8 and the power source 15 and the detection resistor 1 is connected between a source of the output semiconductor element 8 and the ground.

The modification of FIG. 5 operates like the first embodiment and provides similar effect.

Second Embodiment

Figure 6:
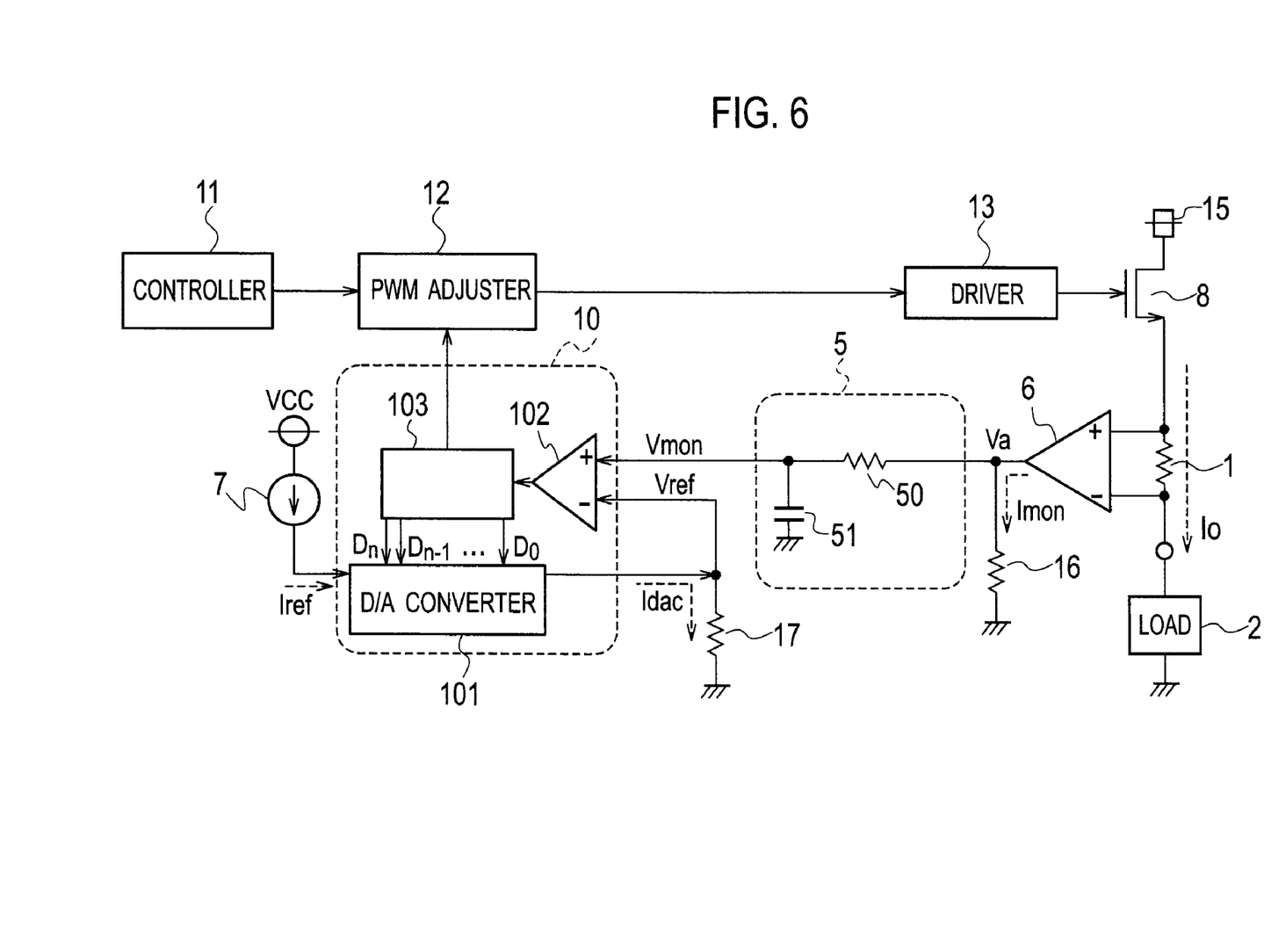
FIG. 6 is a block diagram illustrating a driving circuit of a load according to a second embodiment of the present invention.

FIG. 6 is a block diagram illustrating a driving circuit of a load according to the second embodiment of the present invention. The second embodiment differs from the first embodiment in that the second embodiment employs an A/D converter 10 of different configuration and that a current Iref of a current source 7 of the second embodiment passes through a D/A converter 101 in the A/D converter 10, the D/A converter 101 converting the current Iref into a current Idac which passes through a resistor 17 to the ground.

In FIG. 6, the A/D converter 10 includes the D/A converter 101, a comparator 102, and a logic 103. The A/D converter 10 is of a successive comparison type that is described in, for example, Grebene, "Bipolar and MOS Analog Integrated Circuit Design", Wiley Interscience.

The D/A converter 101 weights the current Iref from the current source 7. The resistor 17 converts the weighted current Idac from the D/A converter 101 into a voltage Vref serving as a reference voltage.

The comparator 102 compares the reference voltage Vref with a monitored voltage Vmon smoothed by an integrator 5. The logic 103 controls bits of the D/A converter 101 in such a way as to equalize the reference voltage Vref and monitored voltage Vmon with each other.

The remaining part of the second embodiment is the same as that of the first embodiment, and therefore, the explanation thereof is omitted.

Operation of the second embodiment will be explained. The operation of the second embodiment is basically the same as that of the first embodiment. According to the second embodiment, a detection resistor 1 converts a current Io passing through the load 2 into a voltage, and according to the voltage, a current output amplifier 6 outputs a monitored current Imon to a resistor 16, like the first embodiment. A relationship between the output current Imon from the current output amplifier 6 and the current Io to the load 2 is as expressed in the expression (4) of the first embodiment. Namely, the monitored current Imon from the current output amplifier 6 is smaller than the current Io to the load 2 by a predetermined ratio.

The resistor 16 converts the monitored current Imon from the current output amplifier 6 into a monitored voltage Va and supplies the same to the integrator 5. The integrator 5 smoothes the monitored voltage Va and outputs a monitored voltage Vmon.

The current source 7 provides the D/A converter 101 in the A/D converter 10 with the constant current Iref without being influenced by variation of ambient temperature. The D/A converter 101 weights the current Iref according to N bits and provides a current Idac to the resistor 17. The output current Iref from the current source 7 is stable with respect to temperature variation, and therefore, the output current Idac weighted by the D/A converter 101 is stable with respect to temperature variation.

The resistor 17 converts the current Idac of the D/A converter 101 into a reference voltage Vref.

The A/D converter 10 uses the reference voltage Vref from the resistor 17, to conduct A/D conversion on the monitored voltage Vmon smoothed by the integrator 5 and outputs a detected current value of the current passing through the load 2.

More precisely, the comparator 102 in the A/D converter 10 compares the monitored voltage Vmon corresponding to the current Io passing through the load 2 with the reference voltage Vref, and if the monitored voltage Vmon is equal to or larger than the reference voltage Vref, provides the logic 103 with a high-level signal.

According to the output voltage from the comparator 102, the logic 103 outputs binary signals Dn-1 to D0 to the D/A converter 101 to equalize the monitored voltage Vmon and reference voltage Vref with each other. When the monitored voltage Vmon agrees with the reference voltage Vref, the logic 103 outputs signals Dn-1 to D0 as a digital detected current value corresponding to the current Io of the load 2 to a PWM adjuster 12.

Like the embodiment 1, the resistors 16 and 17 of the second embodiment are made of the same material in the same size, and therefore, have similar temperature coefficients. A resistance ratio of R16/R17 of the resistors 16 and 17 is unaffected by temperature variation. Since the resistors 16 and 17 have the same characteristic, a relationship between the monitored voltage Vmon and the reference voltage Vref is maintained even if temperature variation occurs. The A/D converter 10, therefore, correctly compares the monitored voltage Vmon with the reference voltage Vref without the influence of the temperature variation and correctly provides the current value of the current passing through the load 2. The resistors 16 and 17 made of the same material in the same size are arranged adjacent to each other on the same chip and the resistance ratio of R16/R17 of the resistors 16 and 17 is kept unchanged even if processing variation and temperature variation are involved. Accordingly, the driving circuit of the second embodiment is capable of stably carrying out the feedback control to provide an instructed current specified by the controller 11 to the load 2.

According to the instructed current value from the controller 11 serving as a target current value and the detected current value from the A/D converter 10, the PWM adjuster 12 adjusts a PWM signal in such a way as to supply the target current to the load 2.

The remaining operation of the second embodiment is the same as that of the first embodiment, and therefore, the explanation thereof is omitted.

In this way, the driving circuit according to the second embodiment of the present invention is capable of passing an instructed current specified by the controller 11 to the load 2 even if temperature variation occurs.

As mentioned above, the present invention is capable of passing an instructed current to a load without being influenced by temperature variation.

The driving circuit according to the present invention is applicable to drive, for example, a linear solenoid to linearly control hydraulic pressure according to a control current.

This application claims benefit of priority under 35 USC §119 to Japanese Patent Application No. 2008-258517 filed on Oct. 3, 2008, the entire content of which is incorporated by reference herein.

Although the present invention has been described above by reference to certain embodiments of the present invention, the present invention is not limited to the embodiments described above. Modifications and variations of the embodiments described above will occur to those skilled in the art in light of the teachings. The scope of the present invention is defined with reference to the appended claims.

What is claimed is:

1. A driving circuit of a load, having a first semiconductor element that is connected in series in a power supply path from a DC power source to the load and is turned on/off to control a current passing through the load, the driving circuit comprising:
    a PWM signal generator configured to generate a PWM signal for controlling ON/OFF of the first semiconductor element;
    a driver configured to drive the first semiconductor element according to the PWM signal;
    a first resistance element made of a semiconductor, connected in series with the first semiconductor element and load, and configured to detect a current passing through the load;
    a current detector configured to output a monitored current corresponding to the current passing through the first resistance element without being influenced by variation of ambient temperature;
    a second resistance element configured to convert the monitored current into a monitored voltage;
    an integrator configured to smooth the monitored voltage;

a current source configured to output a constant current without being influenced by variation of ambient temperature;

a third resistance element configured to output a reference voltage according to the constant current; and an A/D converter configured to convert the smoothed monitored voltage according to the reference voltage into a detected current value of the current passing through the load, wherein the PWM signal generator adjusting the PWM signal according to a target current value and the detected current value in such a way as to supply a target current to the load.

2. The driving circuit of claim 1, wherein
the second and third resistance elements have the same temperature coefficient, the temperature coefficient indicating a ratio of change of resistance value with respect to temperature change.

3. The driving circuit of claim 1, wherein
the second and third resistance elements are resistors made of the same material and having the same dimension.

4. The driving circuit of claim 1, wherein:
the A/D converter includes a D/A converter configured to weight the current of the current source;
the third resistance element converts the weighted current into the reference voltage; and
the A/D converter also includes a comparator configured to compare the reference voltage with the smoothed monitored voltage and a logic configured to control bits of the D/A converter in such a way as to equalize the reference voltage and smoothed monitored voltage with each other.

* * * * *